United States Patent [19]
Fishman et al.

[11] 3,800,143  
[45] Mar. 26, 1974

[54] AGC FOR RADIATION COUNTER

[75] Inventors: Jack B. Fishman, Pasadena; William E. Mutschler, Leverne, both of Calif.

[73] Assignee: Nucleonics Development Company, Monrovia, Calif.

[22] Filed: Feb. 16, 1972

[21] Appl. No.: 226,801

[52] U.S. Cl. .............................................. 250/363
[51] Int. Cl. ............................................ G01j 39/18
[58] Field of Search ..................... 250/71.5 R, 83 C

[56] References Cited
UNITED STATES PATENTS

| | | | |
|---|---|---|---|
| R24,797 | 3/1960 | Scherbatskoy | 250/71.5 R |
| 3,487,222 | 12/1969 | Martens | 250/71.5 R |
| 3,515,878 | 6/1970 | Ried | 250/71.5 R |
| 3,270,205 | 8/1966 | Ladd et al. | 250/71.5 R |

OTHER PUBLICATIONS

"Stabilizing Scintillation . . . " by de Waard, Nucleonics, July 1955, pp. 36–41.

*Primary Examiner*—James W. Lawrence
*Assistant Examiner*—Harold A. Dixon
*Attorney, Agent, or Firm*—Lindenberg, Freilich & Wasserman

[57] ABSTRACT

Apparatus for detecting nuclear radiation from a source not absorbed by target material, in order to measure density or thickness of the material, employs a process for detecting radiation particles which converts the energy level of the particles to pulse height, through a photomultipler tube, one pulse for each separate particle detected, and develops an AGC signal for stabilizing the gain of the conversion system, through the high voltage power supply of the photomultiplier tube, by effectively comparing the pulse rate of a low level threshold detector, used to reject noise pulses in the conversion system, with come multiple R of a higher level threshold detector, where R is the anticipated ratio of low energy level particles to high energy level particles predetermined from an energy level spectrum or histogram of the source. The multiple R is introduced by dividing the lower-level rate by the product RN while the upper level rate is divided by N, where N is an arbitrary integer.

4 Claims, 3 Drawing Figures

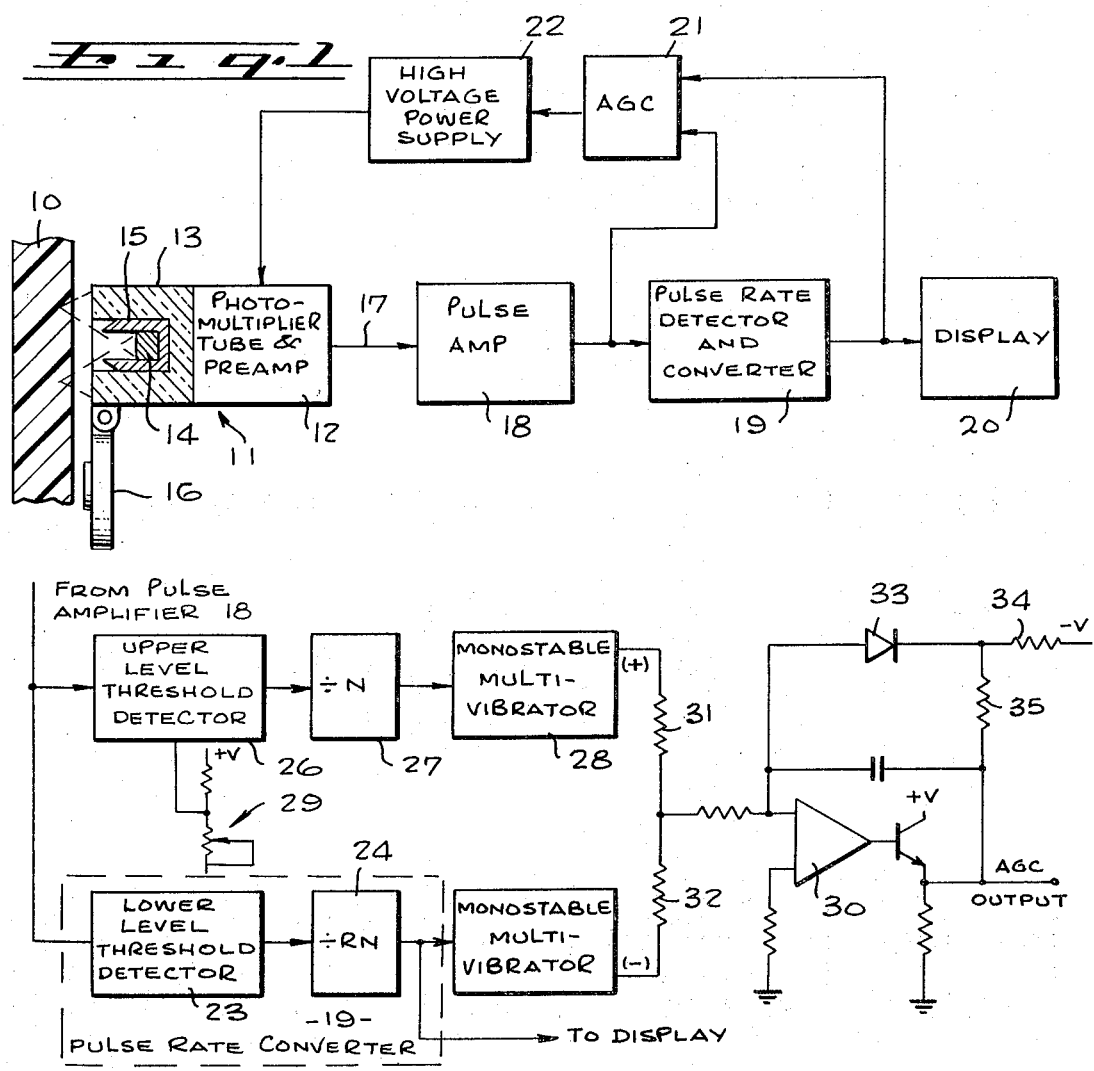
Fig. 1
Fig. 2
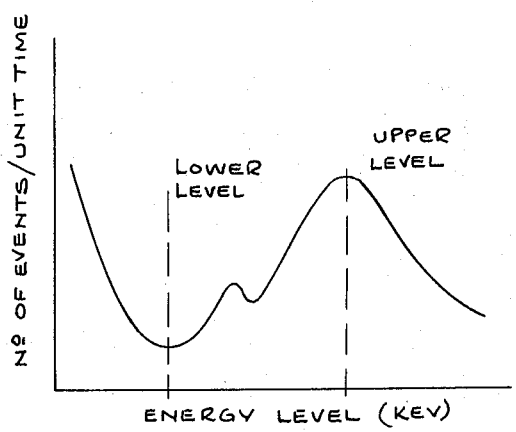
Fig. 3

AGC FOR RADIATION COUNTER

BACKGROUND OF THE INVENTION

This invention relates to automatic gain control for a radiation counter, particularly in apparatus for measuring the density or thickness of material using nuclear techniques, and more particularly to apparatus for producing an automatic gain control signal in a system used to detect radiation transmitted through or backscattered from material in the path of radiation.

Inspection of material using nucleonic techniques depends on absorption or scattering of radiation. Since the parameter of interest in the inspection process if the thickness or density of material, radiation flux density must be of sufficient magnitude to penetrate the material and still allow for a measurable degree of radiation. If the determination cannot be accomplished by transmission, the thickness or density of the material can still be measured by detecting backscattered radiation on the same side of the material as the radioactive source. In either case, the detection system must respond to flux intensities which arise with no absorbing material present and to that flux intensity which arises with the maximum amount of absorption that takes place when the material to be inspected is placed in the path of the radiation.

The technique of detecting backscattered radiation is generally used where it is not feasible to place the radiation source on one side of the material and the radiation detector on the other side, but the basic principles are the same since the amount of radiation backscattered is proportional to the thickness or density of the materil. Given a uniform density, such as the density of plastic material in tubing to be used for gas lines, the thickness of the material can be monitored during production. Conversely, if thickness is known to be constant, density of the material can be monitored.

Only the arrangement for measuring backscattered radiation need be considered in any detail since the other possible arrangement differs only in where the radiation detector is placed. The radioactive source is placed inside of a lead block into which is bored a small-diameter hole. The block is thick enough to absorb the penetrating radiation from the source so that radiation can only emerge through the opening. In that manner, a parallel beam of radiation is produced. When material is positioned in front of the beam, radiation is scattered back to impinge upon an annular crystal surrounding the lead shield. Each time an impinging photon or charged particle interacts with the crystal structure, a flash of light is produced. The crystal structure thus functions as a scintillator.

The scintillator is optically coupled to a photomultiplier tube. Accordingly, light produced in the scintillator causes the release of electrons from the photo cathode of the tube. The number of electrons progressing up the chain of dynodes between the photocathode and the anode is multiplied by secondary emission at each dynode.

Since the number of photons or charged particles is proportional to the density or thickness of the material, the number of electron pulses produced is proportional to the density or thickness. These pulses can be amplified, shaped and counted for a direct readout of the parameter being measured. In other words, the radioactive process of nuclear disintegration causes the emission of radiation, either particulate or electromagnetic in character. This radiation, when detected, has an energy distribution. This energy distribution is either inherent in the radiation or is caused by its interaction with the material being examined. The relative number of rays produced at each energy level for any given source, target material and geometry is given by an invariant probability density function which is unique to the particular arrangement.

Once the impinging radiation on the scintillator has been converted to pulses at the output of the photomultiplier tube, it is known that the pulse height of any particular pulse produced is directly proportional to the intensity of the light flash produced in the scintillator, and is therefore a direct measure of the energy of the radiation detected. The electronic circuits connected to the output of the photomultiplier tube effectively establish a level on the energy-level spectrum or histogram of the radiation source being used, and count the number of pulses per unit time having energies higher than that energy level.

The problem with this technique for measuring thickness of density of material is one of maintaining the detected energy-level spectrum constant with respect to a reference voltage employed for detecting pulses having higher energy levels. This means that the conversion process from radiation energy must be constant regardless of source density, temperature, and any characteristics of the components affecting the conversion. Since variations in the process for converting radiation energy level to pulse height represents variations in the gain of the detection system, it is desirable to compensate for such variations in the gain of some element in the detection system. The gain of the photomultiplier tube is dependent on the high voltage applied to it so that if an AGC signal can be developed and used to control the high voltage power supply of the photomultiplier tube, stabilization of the measuring system can be achieved. The problem is in developing the AGC signal. Accordingly, it is an object of this invention to provide a system for obtaining an AGC signal to stabilize a radioactive thickness or density measuring system. Another object is to provide an AGC system which does not require a radiation reference to stabilize the energy-level to pulse-height conversion process in a thickness or density measuring system using nucleonic techniques.

SUMMARY OF THE INVENTION

These and other objects of the invention are achieved in a system for detecting radiation not absorbed by target material (i.e. in a system for detecting radiation backscattered by or passing through target material) using a beam of radiation from a selected radioactive source directed at the target material. An AGC signal is developed for the measuring system which stabilizes the main lobe (highest peak) of the energy level or pulse height distribution curve in the process of converting radiation energy to pulse height. The AGC signal stabilizes the main lobe at an upper threshold level selected a proper amount above a lower threshold level. The latter is set at a level selected for the measuring system to exclude noise pulses, which is at a level corresponding to a null below the main lobe for the radioactive source being useed. This is accomplished by setting the lower threshold level in one pulse height detection channel, and so selecting the upper level threshold level for a second pulse height detection channel that the main lobe of the pulse amplitude distribution curve is centered about the upper threshold level. The ratio of pulses counted from the lower level threshold detection channel to the pulses counted from the upper level threshold detection channel will remain constant if the process for converting radiation energy to pulse height is stable. Consequently, dividing the pulses from the lower threshold detection channel by that ratio, and comparing the resulting pulse rate with the rate of pulses detected in the upper level threshold channel yields an AGC signal which may be used to stabilize the conversion process by controlling the gain of an element in the system for that process.

BRIEF DESCRIPTION OF THE DRAWINGS

FIG. 1 shows a block diagram of a system for measuring the density or thickness of material using nucleonic techniques, and embodying the concept of the present invention.

FIG. 2 is a schematic diagram, partially in functional-block form, illustrating an exemplary embodiment of the AGC circuit for the system of FIG. 1 embodying the concept of the present invention.

FIG. 3 shows an exemplary histogram for a typical radiation source useful in understanding the concept of the present invention.

DESCRIPTION OF THE PREFERRED EMBODIMENTS

FIG. 1 illustrates a system for measuring the density or thickness of a material 10 for use in those applications where access to only one side of the material is feasible. The system is comprised of a measurement probe 11 approximately 1.5 inches in diameter and 9 inches long. The probe consists of a photomultiplier tube (PMT) and preamplifier 12, a scintillator 13 and a radioactive source 14 inside a cylindrical lead shield 15. A hinged shield 16 covers the radioactive source when the system is not used.

The arrangement of a measuring system operates on the principle that radiation impinging the target material 10 causes radiation to be backscattered to the scintillator 13, which is a suitable energy conversion medium, such as a crystal of sodium iodide (NaI) for gamma particles, or a beta sensitive plastic scintillator such as NE-102 or anthracene for beta particles. When a radiation particle interacts with the scintillator 13, a flash of light is produced. This flash of light is optically coupled to the photocathode of the PMT and causes the photocathode to release the electrons. The electrons are multiplied by dynodes, and collected by an anode. Electrical pulses thus produced by flashes of light are amplified by a preamplifier to a level sufficiently high for transmission through a shielded lead 17 to a pulse amplifier 18.

Since the amount of radiation is proportional to the density or thickness of the target material, it is possible to detect these pulses above a predetermined threshold level (selected to reject noise pulses) in a circuit 19 which converts the rate of pulses thus detected to a lower rate using a conventional pulse rate divider. The output of this pulse detector and rate converter may be displayed in a unit 20 in either a digital or analog form using conventional digital or analog pulse rate meters.

The display unit may include circuits to linearize the output of the pulse detector and rate converter 19. That is desirable because while the pulse rate thus produced is proportional to the density or thickness of the target material 10, it is not linearly proportional, and a linear display will facilitate interpreting the measured thickness or density.

Radiation backscattered by the target material 10 onto the scintillator 13 will produce a flash of light for each particle impinging the scintillator with an intensity directly proportional to the energy of the absorbed particle. Accordingly, if the process of converting particle energy level to pulse height is stable, the output pulse rate of the converter 19 could be relied upon for the measurement output. However, variations will occur in the conversion process due to such factors as flux intensity variations in the radioactive source, temperature, and aging characteristics inherent in the components employed between the scintillator and the pulse detector. Therefore, an AGC circuit 21 is employed to vary the output of a high voltage power supply 22 for the photomultiplier tube to vary the gain of the photomultiplier tube and thus stabilize the energy level to pulse height conversion process. That is accomplished by applying both the output of the pulse amplifier 18 and the output of the converter 19 to the AGC circuit where a signal is developed to control the high voltage power supply 22 for the correct system gain in accordance with the basic concept of the present invention.

An exemplary implementation of the AGC 21 is shown in FIG. 2. It is comprised of an upper level threshold detecting channel and a lower level threshold detecting channel. The latter includes the pulse rate converter 19 having a threshold detector 23 and a pulse rate divider 24. The output of the converter is transmitted to both the display and a monostable multivibrator 25 which provides a negative pulse for every input pulse with a fixed amplitude and width such that the energy of each pulse is constant.

The upper level channel is similar in that it includes a threshold detector 26, a pulse rate divider 27 and a monostable multivibrator 28. The latter is identical to the multivibrator 25 except that its alternate output terminal is used to obtain positive pulses of the same amplitude and width as pulses from the lower level threshold channel.

The configuration of the upper level threshold detector 26 is similar to the lower level detector except that a variable voltage divider 29 is adapted to select a higher threshold level for detection of pulses from the amplifier 18. Each of the detectors may be a high gain differential amplifier used as a voltage comparator to produce an output pulse rising from 0 to +5 volts each time an input pulse exceeds its threshold (reference) voltage. An emitter follower may be used at the output of each detector to increase its current sink capability.

To facilitate understanding the concept of the invention in general, and the manner in which the upper level threshold is selected in particular, reference is made to FIG. 3 which shows a typical energy spectrum or histogram of a source of radiation having two lobes with the main lobe at a higher energy level and a null (low number of events per unit time) at an energy level below that of a low point between the two lobes. The lower threshold level is set for the null of the histogram as shown in FIG. 3. If the upper threshold level is then set for the center of the main lobe, the pulse rate obtained (with no pulse pile-up occurring) from the lower level threshold detector is twice the pulse rate obtained from the upper level discriminator because the area under the histogram curve between the two levels is approximately equal to the area under the curve above the upper level. Consequently, if the pulse rate obtained from the lower level detector is divided by the product RN while the pulse rate obtained from the upper level detector is divided by N, where N is an arbitrary number and R is the ratio of the lower-level pulse rate to the upper-level pulse rate, the pulse rates at the outputs of the dividers will be equal.

The two pulse trains from the dividers are applied to the multivibrators 25 and 28 to obtain two trains of pulses of equal width and height, but opposite polarity. Upon algebraicly summing the two pulse trains, and integrating the sum, there is produced, as an AGC signal, an average DC voltage which will have a zero derivative with respect to time only if the system gain remains stable. If the system gain changes, the average DC voltage will deviate from zero to so adjust the system gain as to reduce the average DC voltage to zero again.

The AGC signal thus produced is preferably used to control the system gain through the high voltage power supply of the photomultiplier tube in a conventional manner. However, it could be applied to any component part of the system which will affect the conversion system gain. In other word, how the AGC signal is used to stabilize system gain is not a part of this invention which relates to a new and improved technique for developing the AGC signal.

When the system is turned on initially, the AGC output will rise to some positive value sufficient to cause the high voltage power supply to operate at a level for a desired average system gain. That level is controlled by a clamping diode 33 and biasing resistors 34 and 35.

In practice, the lower threshold level is predetermined and fixed in the design of the detector 23, but the upper threshold level is adjusted within a predetermined range for a pulse rate ratio of R for any target material. With practice, this can be done by simply looking at the average height of pulses from the amplifier 18 for a given ratio R. In the example of FIG. 3, the ratio is 2, but since any radiation source may be used having a distinguishable main lobe, the ratio may be some other value, particularly if the main lobe is not symmetrical as in the case of FIG. 3. In each case, the ratio can be predetermined from the known histogram of the source material. That sets the value of R. The task of adjusting the upper threshold level is then one of simply adjusting the upper threshold level.

Any target material can be used while adjusting the upper level because the adjustment does not affect calibration. An adjustment for calibration is made in the display unit 20, along with an adjustment for linearizing the output as desired.

The adjustment of the upper threshold level is simply to set the ratio of pulses detected at the lower level to the pulses detected at the upper level equal to the predetermined value R. This adjustment is simple, and not critical.

Because emission of particles is a random phenomenon, the rate of particles detected at the lower level has a statistical variation. If the number of particles detected in a given time is a number A, there is a statistical variation $+\Delta A$ called the standard deviation $\sigma$ equal to the square root of A. For example, if $A = 100$, then $\sigma = 10$ and the reading ($A \pm \Delta A$) is $100 \pm 10$ for an error of $\pm 10$ percent. If $A = 10,000$, then $\sigma = 100$ and the reading is $10,000 \pm 100$ for an error of $\pm 1$ percent. Thus the accuracy of the system is inherently limited by this statistical fluctuation, but accuracy can be improved by either increasing the number of particles available with a larger radioactive source, or by increasing the time constant of the display unit so that more particles are detected to give a reading. Beyond that, accuracy can be further improved by averaging several readings, as is standard practice for all measurements made with instruments when greater accuracy is desired.

This limitation on accuracy is pointed out to emphasize that setting the upper threshold level is not critical, which implies that setting the lower threshold is likewise not critical. The latter is predetermined and fixed in the design of the system for use with a given radioactive source, as noted hereinbefore, and serves primarily to exclude noise pulses. The upper threshold level need only be adjusted to yield a ratio of pulses approximately equal to the predetermined value R, which implies that R need not be predetermined with any greater accuracy. Once the upper threshold level is adjusted, the AGC circuit will maintain the system gain stable. Then the system readout can be calibrated.

As noted hereinbefore, this ratio of pulse rates detected assumes no pulse pile-up occurring, i.e. assumes two particles do not strike the scintillator simultaneously, or so close together that the conversion system components, such as the monostable multivibrators, cannot respond to both. That is a reasonable assumption because there is nearly equal probability of pulse pile-up occurring within each region above and below the upper threshold level. This is an improvement of prior art methods, e.g. in methods in which a reference source of radiation is used to develop an AGC signal where there is a higher probability of pulse pile-up at higher count rates, without any compensating factors, making the system less sensitive with high radiation because of the AGC action. Therefore, as noted hereinbefore in the discussion of statistical variation, this new AGC circuit allows operation at higher count rates with improved statistical accuracy.

Although a particular embodiment of the invention has been described and illustrated herein, it is recognized that modifications and variations may readily occur to those skilled in the art, such as placing the source of radiation on one side of target material and the scintillator on the other side to measure density or thickness of the target material by detection of particles passing through the material, instead of detecting particles backscattered by the material. Consequently, it is intended that the claims be interpreted to cover such modifications and variations.

What is claimed is:

1. In apparatus for measuring density or thickness of material employing a beam of radiation from a nuclear source, said radiation having a known energy level spectrum of radiation events per unit time, either inherent in said radiation or caused by its interaction with said material, said spectrum having one main lobe with a peak higher than any other lobe, said apparatus having a scintillator positioned proximate to said material and responsive to each event of said radiation passing through or backscattered from, and therefore not absorbed, by said material for producing a flash of light with intensity proportional to radiation event energy; means optically coupled to said scintillator for converting each flash of light produced by said scintillator into an electrical pulse directly proportional in height to light flash intensity; threshold means for detecting pulses from said converting means above a predetermined level corresponding to a lower level of radiation event energy at a low level null in said spectrum, thereby rejecting noise pulses from said converting means; and means responsive to said threshold means for indicating material density or thickness as a function of the rate of lower level pulses detected, the improvement of an automatic gain control system for stabilizing the gain of the process for conversion of radiation event energy received by said scintillator to electrical pulse height comprised of an auxiliary threshold means for detecting electrical pulses from said converting means above a predetermined level corresponding to an upper level of radiation event energy at a high level in said spectrum approximately at the center of said main lobe, means for dividing the rate of pulses from said lower level threshold detecting means by a predetermined factor relative to the rate of pulses from said upper level threshold detecting means, where said factor is the ratio of pulses anticipated from said lower level threshold detecting means to pulses anticipated from said upper level threshold detecting means in view of the threshold levels selected for pulse heights corresponding to predetermined energy levels on said spectrum, means for comprising said rate of pulses from said lower level threshold detecting means divided by said factor with the rate of pulses from said upper level threshold detecting means, and means responsive to said comparing means for producing said automatic gain control signal proportional to the difference between said pulse rates compared, and with a polarity corresponding to the sign of said difference according to a predetermined selection of polarity for a given algebraic sign of said difference.

2. The improvement defined by claim 1 wherein said means for converting each flash of light produced by said scintillator into an electrical pulse is comprised of a photomultiplier tube and a signal controlled source of voltage applied thereto, and said automatic gain control signal is applied to said power supply to stabilize the gain of the process for convertion of radiation event energy received by said scintillator to electrical pulse height.

3. Apparatus for stabilizing the gain of a process for conversion of radiation event energy, where the radiation has a known energy level spectrum of radiation events per unit time, said spectrum having one main lobe with a peak higher than any other lobe, the combination of a scintillator for emitting a flash of light in response to each event of radiation impinging thereon, each flash of light having a height proportional to radiation event energy, means optically coupled to said scintillator for converting each flash of light produced by said scintillator into an electrical pulse directly proportional in height to light flash intensity, a first threshold detecting means for detecting pulses from said converting means above a predetermined level of radiation event energy at a low level null in said spectrum, thereby rejecting noise pulses from said converting means, means for converting the rate of pulses detected by said first threshold detecting means to a lower rate by dividing by a predetermined number, means responsive to pulses from said last named means for producing an indication of radiation received by said scintillator as a function of the rate of lower level pulses detected, a second threshold means for detecting electrical pulses from said converting means above a predetermined level corresponding to an upper level of radiation event energy at a high level in said spectrum approximately at the center of said main lobe, means for comparing said rate of pulses from said second threshold detecting means divided by a predetermined number less by a given factor than said number by which pulses are divided in said converting means, where said given factor is the ratio of pulses anticipated from said first threshold detecting means to pulses anticipated from said second threshold detecting means in view of levels selected for said first and second threshold detecting means on said spectrum, means responsive to said comparing means for producing an automatic gain control signal proportional to the difference between said pulse rates compared, and with a polarity corresponding to the sign of said difference according to a predetermined selection of polarity for a given algebraic sign of said difference, and means responsive to said automatic gain control signal for driving the gain of said converting means to reduce said difference to zero.

4. The combination of claim 3 wherein said means for converting each flash of light produced by said scintillator into an electrical pulse is comprised of a photomultiplier tube and a signal controlled source of voltage applied thereto, and said means responsive to said automatic gain control signal for driving the gain of said converting means to reduce said difference to zero is said source of voltage.

* * * * *